July 18, 1950 E. C. KASTNER Re. 23,249

METHOD AND MACHINE FOR EXTRACTING AIR BAGS

Original Filed May 1, 1946 4 Sheets-Sheet 1

INVENTOR.
EDWARD C. KASTNER
BY
Bates, Teare, & McBean
ATTORNEYS

METHOD AND MACHINE FOR EXTRACTING AIR BAGS
Original Filed May 1, 1946 4 Sheets-Sheet 2
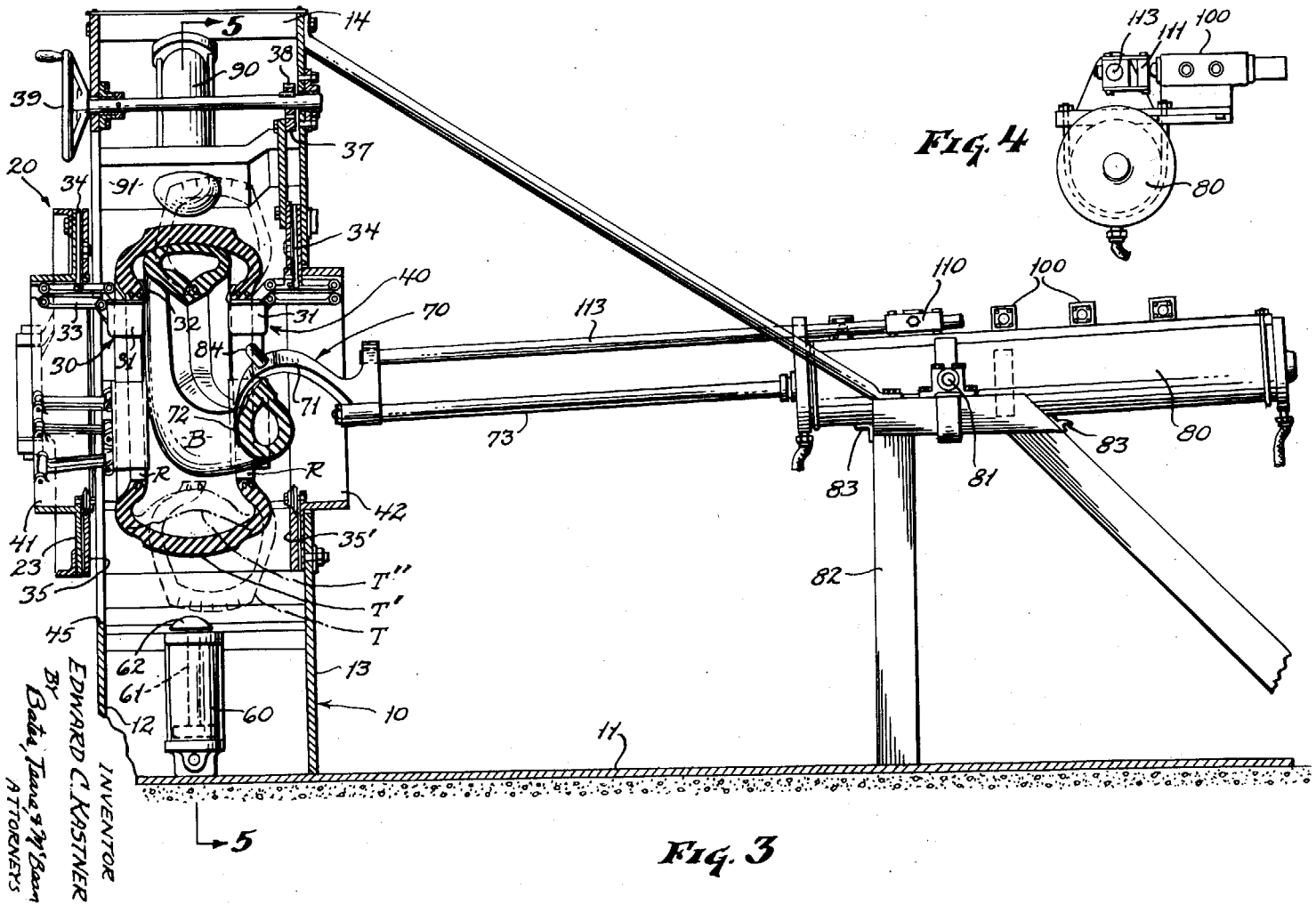

METHOD AND MACHINE FOR EXTRACTING AIR BAGS

Original Filed May 1, 1946 4 Sheets-Sheet 3

INVENTOR.
EDWARD C. KASTNER
BY
Bates, Teare, & McBean
ATTORNEYS

METHOD AND MACHINE FOR EXTRACTING AIR BAGS

Original Filed May 1, 1946 4 Sheets-Sheet 4

INVENTOR.
EDWARD C. KASTNER
BY
Bates, Teare, & McBean
ATTORNEYS

Reissued July 18, 1950

Re. 23,249

UNITED STATES PATENT OFFICE 23,249

METHOD AND MACHINE FOR EXTRACTING AIR BAGS

Edward C. Kastner, Akron, Ohio, assignor to Akron Standard Mold Company, Akron, Ohio, a corporation of Ohio Original No. 2,477,301, dated July 26, 1949, Serial No. 666,267, May 1, 1946. Application for reissue February 14, 1950, Serial No. 144,051

18 Claims. (Cl. 18—2)

Figure 2:
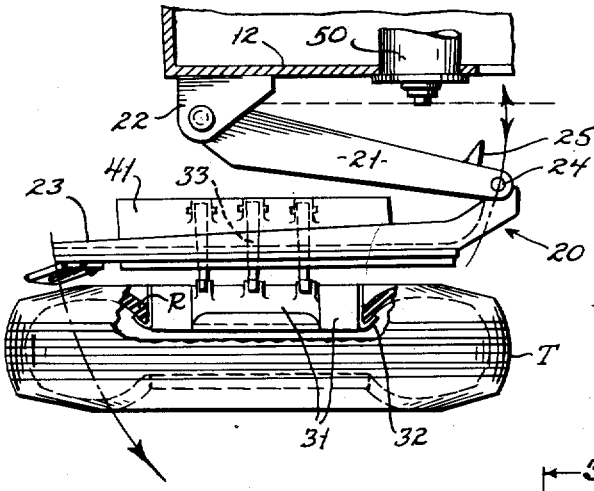

Matter enclosed in heavy brackets [ ] appears in the original patent but forms no part of this reissue specification; matter printed in italics indicates the additions made by reissue

*This invention relates to a method and machine for removing the air bag from a newly vulcanized tire.*

[This invention relates to air bag extracting machines and is in the nature of an improvement over that shown in patent application Serial No. 654,770, filed by me on March 15, 1946, and entitled Method and machine for extracting air bags.]

The air bag upon which the machine of that invention and the machine of the present invention are designed to operate is the usual device in the nature of an inner tube which is inserted into a partially cured tire casing when the latter is put into a vulcanizing mold. The air bag is there inflated under pressure to force the casing outwardly against the mold members. When the tire is subsequently withdrawn from the mold, the air bag must be removed to enable the succeeding manufacturing operations on the tire.

To remove the air bag it must first be forced radially inwardly through the gap between the two bead rims of the tire and then withdrawn axially through the circular opening defined by one of the bead rims. In the performance of this operation, heretofore, a localized portion of the air bag was forced radially inwardly past the bead rims and then engaged by an extractor of some form. The extractor pulled the air bag from the tire, a kink being formed in the air bag at either side, where it was forced to bend over the bead rim. Although made of rubber or rubber-like composition, the bag is exceedingly stiff and resistant when kinked and can easily cause a permanent distortion of the bead rim, and, in many cases while being dragged from the tire, has actually pulled the plies away from the tire wall. The likelihood of damage is especially serious in the case of truck tires where a large and bulky air bag must be withdrawn through an opening of small diameter.

[In my former invention, above-mentioned, I provided a method and a machine for removing such an air bag in a safe and effective manner. There the bead rims were pulled apart axially to provide easy egress of the air bag and, after one portion of the tire tread was forced radially inwardly to produce the first bulge in the air bag for engagement by the extractor, other portions of the tread were pressed inwardly progressively around the tire to free more and more of the bag from the confinement of the beads. In this manner the extractor operated only upon already freed portions of the air bag. Prevention of mutilation of the air bag and the tire rim were thus assured.]

[In the former invention, the progressive pressing of the tire tread was obtained by means of a roller which was forced in an arcuate path about the tire by a suitable mechanical linkage. The present invention supplants the mechanical linkage by a pneumatic system having a minimum number of moving parts and adapted to be controlled in a simple and automatic manner.]

An object of the present invention is to provide a machine for removing air bags from tires, especially truck tires, without deforming the bead portion or injuring the adjacent plies.

To accomplish this object, a support for the tire is furnished which grips the bead rims and pulls them axially apart, and means are provided to press radially inwardly on the tread of the tire to force a portion of the air bag through the gap between the beads to a position where it may be engaged by a power operated hook. A series of air cylinders is placed radially about the tire at either side thereof, the plungers of the cylinders extending radially inwardly and thus being adapted to press against the tire tread. As the hook moves axially, under the action of another air cylinder, to pull the air bag from the tire, successive pairs of the air cylinders are energized to free the air bag for easy withdrawal.

Another object of this invention is to provide suitable automatic valves whereby each of the plungers is actuated at the proper time during the withdrawal operation to free its corresponding portion of the air bag.

A further object is to provide means whereby the machine may be adapted to various sizes of tires.

Other objects and advantages of the present invention will be made apparent by the following specification and claims and the appended drawings.

Figure 1:
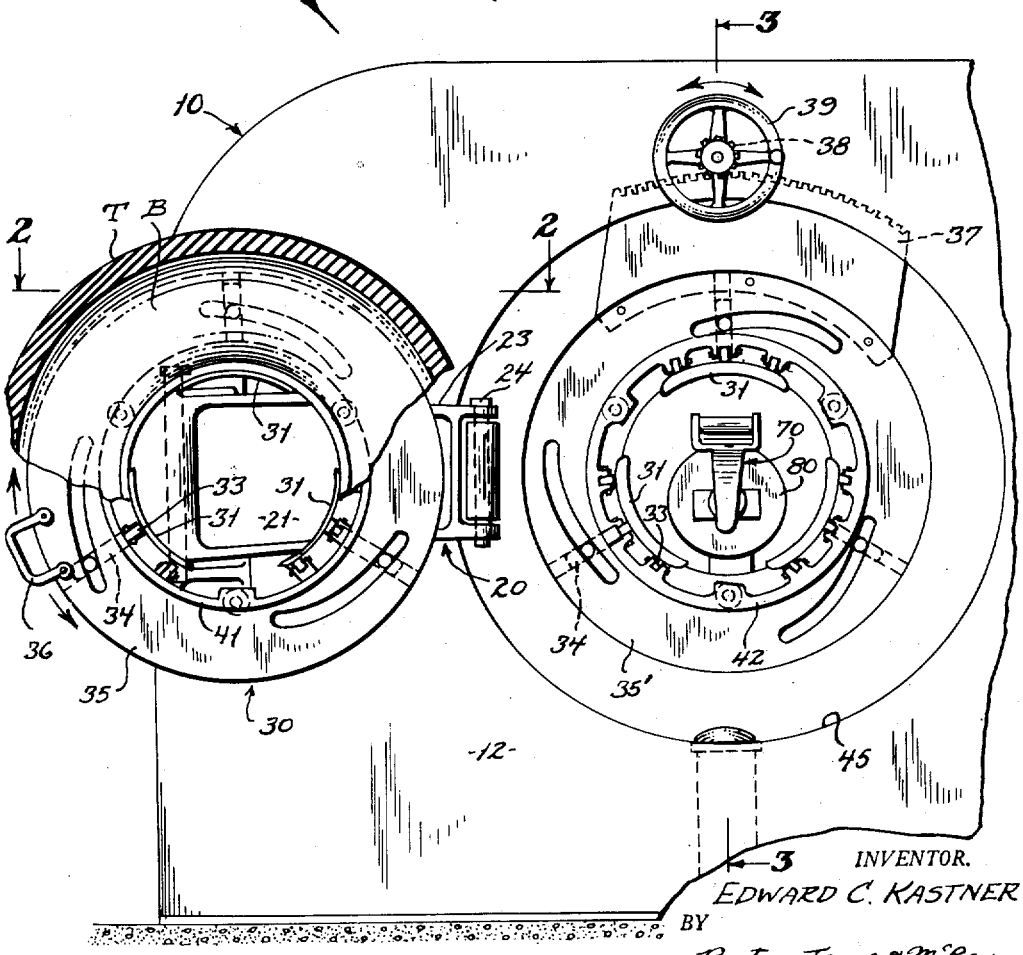
Figure 5:
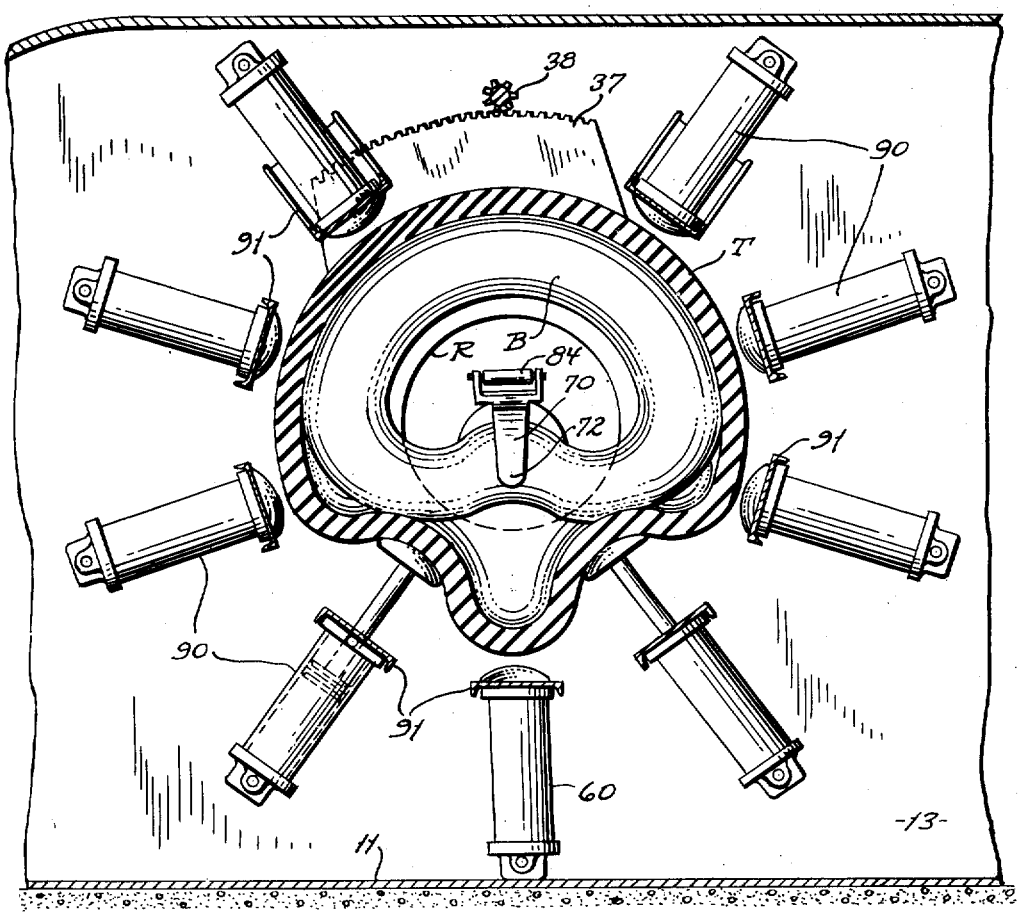
Figure 6:
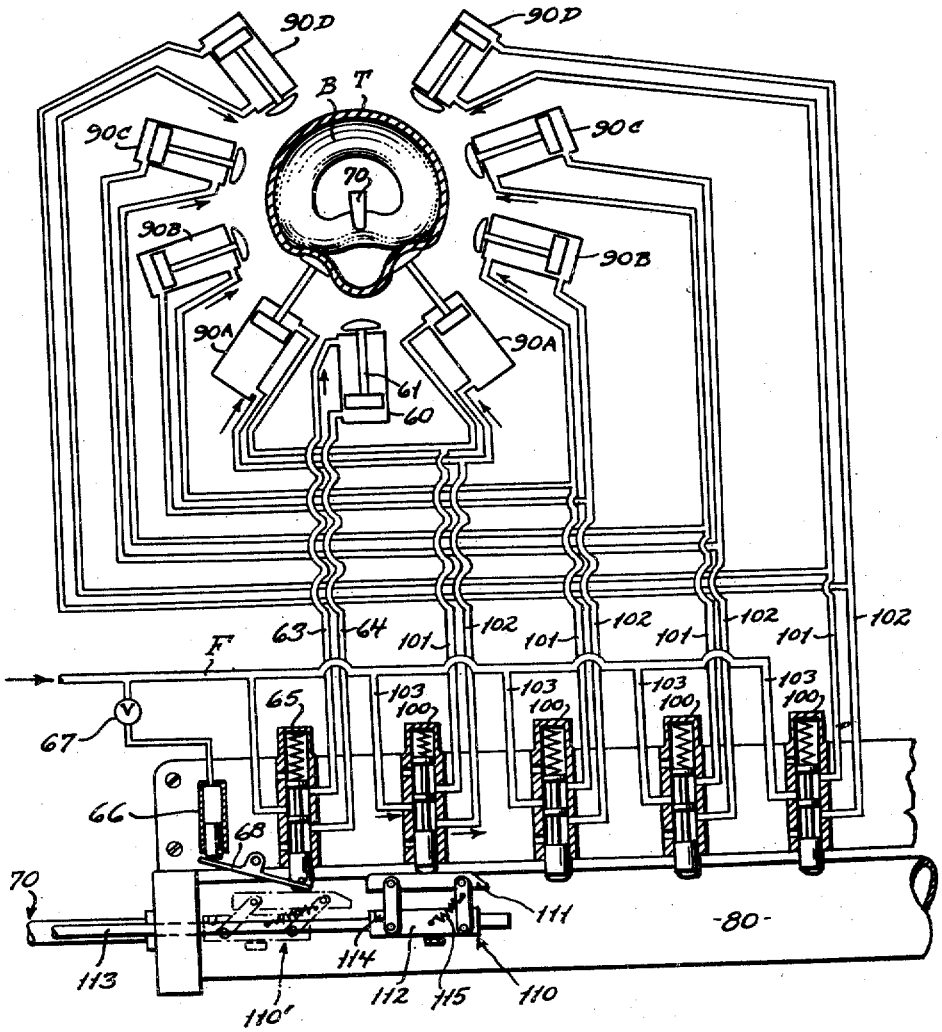

In the drawings, Fig. 1 is a fragmentary front elevational view of a tire air bag removing machine embodying my invention, showing a portion of the tire supporting mechanism swung to tire-receiving position; Fig. 2 is a horizontal section taken on the plane 2—2 of Fig. 1; Fig. 3 is a vertical section taken on the plane 3—3 of Fig. 1 and illustrating a tire in place and an air bag being removed therefrom; Fig. 4 is an end elevational view of the extractor air cylinder and the valve assembly associated therewith; Fig. 5 is a vertical section taken on the plane 5—5 of Fig. 3, and Fig. 6 is a valve and piping diagram.

In the drawings, I have illustrated a preferred embodiment of my invention in the form of a machine for removing air bags from truck tires. A brief preliminary description of the machine as a whole will first be given, followed by a more detailed treatment of some of the parts.

A main frame, indicated generally at 10, carries a hinged support at 20 upon which the tire T with its enclosed air bag B is placed as it comes from the vulcanizer. The hinged support includes a chuck 30 which engages one of the bead rims of the tire. The tire is then manually swung into the machine, to the broken line position T of Fig. 3, where it is engaged by a second chuck 40 which grips the other bead rim. A power device 50 (Fig. 2) then separates the two chucks to open the gap between the bead rims, stretching the tire to the form shown in full lines at T′ in Fig. 3. With the tire in this position, an air cylinder 60 then acts upon the tread of the tire to bow it radially inwardly at T″ to produce an inward bulge in the air bag. A hook 70 is then manually placed on the bulge and an air cylinder 80 is energized to pull the hook and withdraw the air bag.

A plurality of air cylinders 90 are mounted in the machine in a circular array about the tire position and radially aligned with the latter. Corresponding cylinders at opposite sides of the tire are connected in pairs and each pair is provided with an air valve 100. The valves are mounted in a row on the hook cylinder 80 and are adapted to be actuated by an abutment 110 carried by the hook. The plungers of the air cylinders 90 are normally retracted but as the hook withdraws the air bag the abutment engages each valve in succession, and each pair of air cylinders is actuated in succession to eject a further portion of the air bag from behind the bead rim. When the top pair of air cylinders has been operated, the air bag is completely freed from the tire and the air bag falls at the rear of the machine or upon an appropriate conveyor, if desired. As the abutment 110 passes beyond each valve in succession, the plungers of the corresponding air cylinders return to retracted position spaced from the tire tread. Thus, after being freed of its air bag, the tire may be removed from the machine by releasing the pressure device 50 and then the rear chuck 40, and then, after the support 20 has been swung to its open position, releasing the chuck 30.

Referring to the various parts in a more detailed manner, the main frame 10 comprises chiefly a base 11, a front wall 12, a rear wall 13, and tie members 14.

The swinging tire support 20 comprises an arm 21 pivoted on a bracket 22 carried by the front wall 12, and an annular head 23 pivoted at 24 on the arm. In the open position, illustrated in Figs. 1 and 2, the head 23 is swung back against the arm and thus exposes its inner face. A stop member 25 (Fig. 2) is provided on the arm to prevent the head from swinging in a closing direction more than a predetermined amount relative to the arm and is thus adapted to transmit the force of the pressure device 50 to the head for the bead stretching operation.

The front and rear bead chucks 30 and 40 and the bead stretching mechanism 50 are the same as those illustrated and described in my former patent application referred to. Briefly, each of the chucks comprises three swinging jaws 31 in the form of curved plates having outwardly turned lips 32. The jaws are carried by pivoted arms 33 and are actuated by radially sliding bars 34. An annular cam plate 35 is provided with three spiral cam slots, each of which coacts with a cam follower on the corresponding sliding bar. Rotation of the cam plate thus collapses the chuck or expands it into secure engagement with the tire bead rim. The cam plate 35 of the front chuck is provided with a handle 36, while the rear chuck cam plate 35′ carries a gear segment 37 which may be turned by a pinion 38 and a hand wheel 39. Cylindrical members 41 and 42, carried by the swinging head 23 and the rear frame wall 13 respectively, support the pivots for the swinging jaws and provide ample openings through which the operator may reach to manipulate the hook and through which the air bag may be withdrawn.

With the tire supported and clamped on the front chuck, as illustrated in Figs. 1 and 2, it is then swung into the frame, through an opening 45 in the front wall, and engaged by the rear chuck. The power device 50, which then separated the two chucks to stretch the bead rims apart, may comprise simply an air cylinder mounted either on the front wall of the machine, as illustrated in Fig. 2, or upon the swinging arm 21. In the first case, the plunger presses against the arm to swing it outwardly, and in the second case presses against the wall with the same result.

While the tire has the stretched configuration, shown at T′ in Fig. 3, it is less rigid in a radial direction than before. Advantage is taken of this fact by pressing inwardly on the tread portion to eject the air bag from behind the bead rims. Ejection of the air bag is initiated by localized pressure on the tire tread to cause a single inward bulge of the air bag. This localized pressure may conveniently be obtained by means of a pneumatic cylinder 60 mounted below the tire position and provided with a plunger 61 having an enlarged head 62. The cylinder 60 is preferably of the double-acting type, so that the plunger may be positively withdrawn, and is under control of a two-way valve 65, as illustrated in the diagram of Fig. 6. Air pressure is constantly supplied to the feed line F during the operation of the machine and, with the valve 65 in its normal position illustrated in Fig. 6, this pressure is applied, through conduit 63, above the piston in the cylinder 60 to retract the plunger. The space below the piston at this time exhausts to the atmosphere through the conduit 64 and thence through the valve.

When the operator has caused the tire to be stretched, as aforesaid, he then operates the valve 65 to energize the cylinder 60. This may be done in a simple manner by means of a control cylinder 66 which may be momentarily energized by means of a valve 67 within easy reach of the operator. The plunger of the cylinder 66 may rock a pivoted arm 68 and thus move inwardly the plunger of the valve 65. With the latter plunger in its inward position, communication is afforded between the air pressure supply F and the space below the plunger 61 through the conduit 64 and the space above the plunger piston exhausts to the atmosphere through the valve. The valve 67 may be in the nature of a push button device for momentary actuation, because the valve 65, when depressed, is maintained in that condition by the abutment 110 as will later be described.

When the cylinder 60 causes the plunger to deform the tire tread, the lower portion of the air bag B is bowed upwardly beyond the bead rims R where it may be engaged by the hook 70. The hook comprises a curved arm 71 having a slightly rearwardly directed free end 72 for positive engagement with the air bag. The hook is rigidly carried by an elongated piston rod 73 extending forwardly from the air cylinder 80. The cylinder is mounted by means of trunnions 81 on a framework 82 secured to the base 11. A rocking motion of the cylinder is thus allowed, to enable the operator to lift the hook over the air bag. The rocking motion may be limited by stops 83 to thereby maintain the hook in the operating region. The hook is provided with a handle 84 for manual placement into proper engagement with the air bag.

The additional air cylinders 90, previously mentioned, may be identical with the cylinder 60 and may conveniently be carried by channel members 91 mounted between the front and rear walls of the frame. The cylinders are connected in pairs beginning with the pair 90A, Fig. 6, adjacent the cylinder 60 and progressing through 90B and 90C, to the pair 90D at the top of the machine.

As shown in the diagram of Fig. 6, each pair of cylinders is provided with suitable conduits and with a valve 100 which may be identical with that of 65. That is, each valve is in communication, at 101 and 102, with the inner and outer ends of its pair of cylinders respectively, and has an air pressure inlet 103. The latter is normally in communication with the conduit 101 to retract the plungers, but may be placed in communication with the conduit 102, instead, to force the plungers against the tire tread when the valve is actuated.

The abutment 110, which actuates the row of valves, comprises a cam bar 111 pivotally carried by parallel links on a block 112. The block is adjustably clamped to a rod 113 and the rod is carried by the hook 70 and guided for longitudinal sliding in appropriate bearings. Thus, as the hook is drawn by its air cylinder to extract the air bag, the abutment is moved past each of the valves in succession. As the abutment is moved to the right in Fig. 6, the cam bar 111, which is maintained against a stop 114 by a light spring 115, cams the plungers of the valves inwardly and then allows them to snap outwardly just prior to its engagement with the succeeding valves.

During the return travel of the abutment, as the hook is returned toward the machine for the start of a succeeding cycle, the cam bar 111 is swung idly downwardly by engagement with the valve plungers, and, when the abutment reaches its forward limit position shown in dotted lines at 110′, the cam bar is maintained in its depressed position by the relatively stronger return spring of the valve 65. However, when the valve 65 is actuated by a momentary opening of the valve 67, the spring 115 is allowed to return the cam bar 111 to its extended position and actuation of the valve 65 is thus continued despite a subsequent closing of the valve 67.

In an operating cycle of the machine, after the tire has been mounted and spread as before described, and with the hook 70 in its normal idle position extending part way through the cylindrical member 42, the operator momentarily opens the valve 67. The lower portion of the air bag is thus bowed upwardly by the cylinder 60 and is there maintained due to the action of the extended cam bar 111 on the valve 65.

The operator then grasps the hook 70 and lifts it forwardly over the air bag and opens, and leaves open, a valve, not shown, which supplies air to the forward end of the air cylinder 80. The hook is thereby drawn at a moderate rate of speed and, by placing tension upon the air bag, prevents its return into the tire.

The action thenceforth is entirely automatic. As the hook pulls upon the air bag the abutment 110 soon leaves the valve 65 and the lower cylinder allows the tire tread to return to normal position. Immediately thereafter, however, the abutment engages the succeeding valve and the lower pair of cylinders 90A are energized to press their plungers against the next succeeding regions of the tire tread. The parts at this time are in the position shown in Figs. 5 and 6. Sufficient additional air bag is thus fed to the withdrawing hook to allow it to pass from behind and bend around the bead rim without injury thereto. In this manner, as the hook moves farther and farther from the tire, more and more of the air bag is released from the bead rims by the successive pairs of cylinders until, as the abutment passes beyond the last valve 100, the air bag is completely released from the tire and drops from the hook.

The operator then actuates the valve, not shown, which controls the air cylinder 80, to direct air pressure to the rear end of the cylinder and thus to return the hook to its idle position ready for the next cycle. It will be understood that, if desired, a further valve may be provided which, upon actuation by the abutment 110 at the end of its stroke, would effect this reversal of movement of the hook.

It will be noted that the bead chucks, in their radial movement, may accommodate various diameters of bead rims, and that, since the amount of deformation of the tire tread is not critical in the proper ejection of the air bag, various outer diameters of tire treads may be accommodated.

Thus my invention provides a machine which is rugged and simple in form and which will remove air bags in a safe and expeditious manner from tires of varying size. While I have described a specific embodiment it will be apparent that numerous changes and modifications may be made within the spirit and scope of my invention. It will be seen, for example, that various forms of supporting devices may be used to grip and separate the bead rims of the tire, and that equivalent forms of power actuated devices may be substituted for the air cylinders to effect successive deformations of the tire tread.

I claim:

1. In a machine for removing an air bag from a tire having bead rims and a tread, a plurality of operating members, means for operating said members successively to deform successive regions of the tread and to thereby eject successive portions of the air bag from between the bead rims, and mechanism adapted to engage the air bag after a portion thereof has been diverted inwardly to withdraw it as it is ejected.

2. In a machine for removing an air bag from a tire having bead rims and a tread, a pressure device adapted to deform a localized region of the tread to bow inwardly beyond the bead rims a portion of the air bag, a member adapted to engage the bowed-in portion of the air bag, mechanism for operating said member to place tension on the air bag axially of the tire, a pair of pressure devices adjacent the first-named device to deform regions of the tread at either side of the first-named region to thereby bow inwardly adjacent portions of the air bag, and further successive pairs of pressure devices and means operating said pressure devices successively to deform the tread to complete the removal of the air bag.

3. In a machine for removing an air bag from a tire having bead rims and a tread, means for bowing in a localized portion of the air bag, a member adapted to engage the localized portion and mechanism for operating it to withdraw it axially from the tire, a plurality of pressure devices adapted to deform regions of the tread to eject the air bag beyond the bead rims, and means for operating the pressure devices successively in timed relationship with the withdrawal of the air bag whereby successive portions of the air bag are ejected inwardly beyond the bead rim at the time when they are bent around the bead rim to pass from the tire.

4. In a machine for removing an air bag from a tire having a bead rim and a tread, a plurality of deforming devices each adapted to deform a region of the tread to eject a portion of the air bag inwardly beyond the bead rim, an extractor adapted to engage the air bag and to move from the tire, a plurality of controlling devices to determine the operation of the deforming devices, and means moved by the extractor into successive engagements with the controlling devices whereby the deforming devices are operated successively at the respectively proper times to eject portions of the air bag which are being bent about the bead rim by the movement of the extractor.

5. In a machine for removing an air bag from a tire having bead rims and a tread, a plurality of plungers adapted to be moved by fluid pressure radially inwardly of the tire whereby each may bulge inwardly a portion of the tire tread and thereby eject a portion of the air bag beyond the bead rims, means for applying fluid pressure to the plungers independently of each other to operate them in succession, and means for engaging the air bag to pull it from the tire as it is ejected.

6. In a machine for removing an air bag from a tire having bead rims and a tread, a plurality of fluid pressure cylinders in circular array, a plunger in each cylinder adapted to force radially inwardly a portion of the tire tread to eject a portion of the air bag beyond the bead rim, a first cylinder in said array, pairs of cylinders comprising cylinders substantially equidistant from the first cylinder, means for applying fluid pressure independently to the first cylinder and to the adjacent pairs of cylinders to operate them in succession, and means for withdrawing the air bag from the tire as it is ejected beyond the bead rim.

7. In a machine for removing an air bag from a tire having bead rims and a tread, a plurality of deforming devices in circular array each adapted to deform a portion of the tread to eject a portion of the air bag inwardly beyond the bead rims, said plurality of devices including a first device and pairs of devices, each member of each pair being substantially equi-distant from the first device, a controlling means for the first device, controlling means for each of said pairs, an extractor for withdrawing the air bag from the tire as it is ejected beyond the bead rims, and actuating means carried by the extractor to actuate in succession all of said controlling means.

8. In a machine for removing an air bag from a tire having bead rims and a tread, a plurality of fluid pressure cylinders in circular array, a plunger in each cylinder adapted to force radially inwardly a portion of the tire tread to eject a portion of the air bag beyond the bead rims, said plurality of fluid pressure cylinders including a first cylinder and pairs of cylinders, each member of each pair being substantially equi-distant from the first cylinder, valve means for controlling the fluid pressure for the first cylinder, valve means for each of said pairs of cylinders, an extractor for withdrawing the air bag from the tire as it is ejected beyond the bead rims, and actuating means moving in unison with the extractor to actuate in succession all of said valve means.

*9. A method of removing an air bag from a tire comprising, bulging radially inwardly a localized region of the tire to thereby bow in a portion of the air bag, thereafter exerting continued pressure on the bowed-in portion of the air bag in a direction generally axially of the tire, and during the application of such pressure bulging inwardly further localized regions of the tire.*

*10. A method of removing an air bag from a tire comprising, bulging radially inwardly a localized region of the tire to thereby bow in a portion of the air bag, exerting continued pressure on the bowed-in portion of the air bag in a direction generally axially of the tire, and bulging inwardly further localized regions progressively around the tire, and allowing each bulged region of the tire to resume its unstressed shape as its neighboring region is stressed in turn.*

*11. A method of removing an air bag from a tire comprising, bulging radially inwardly a localized region of the tire to thereby bow in a portion of the air bag, thereafter exerting continued pressure on the bowed-in portion of the air bag in a direction generally axially of the tire, and during the application of such pressure bulging inwardly further localized regions progressively around the tire simultaneously from both sides of the first named localized region.*

*12. A method of removing an air bag from a tire comprising, bulging radially inwardly a localized region of the tire to thereby bow in a portion of the air bag, exerting continued pressure on the bowed-in portion in a direction generally axially of the tire, and bulging inwardly further localized regions progressively around the tire simultaneously from both sides of the first named localized region, and allowing each bulged region of the tire to resume its unstressed shape as its neighboring region is stressed in turn.*

*13. The method of removing an air bag from a tire having bead rims and a tread comprising, axially separating the bead rims to allow passage of the air bag therebetween and to reduce the radial rigidity of the tread portion, bulging radially inwardly a localized region of the tread to thereby bow in a portion of the air bag, thereafter exerting continued pressure on the bowed-in portion of the air bag in a direction generally axially of the tire, and following the initiation of such pressure bulging inwardly further localized regions of the tread progressively around the tire.*

*14. The method of removing an air bag from a tire having bead rims and a tread comprising, axially separating the bead rims to allow passage of the air bag therebetween and to reduce the radial rigidity of the tread portion, bulging radially inwardly a localized region of the tread to thereby bow in a portion of the air bag, exerting continued pressure on the bowed-in portion of the air bag in a direction generally axially of the tire, and bulging inwardly further localized regions of the tread progressively around the*

*tire, and allowing each bulged region to resume its unstressed shape as its neighboring region is stressed in turn.*

*15. The method of removing an air bag from a tire having bead rims and a tread comprising, axially separating the bead rims to allow passage of the air bag therebetween and to reduce the radial rigidity of the tread portion, bulging radially inwardly a localized region of the tread to thereby bow in a portion of the air bag, thereafter exerting continued pressure on the bowed-in portion of the air bag in a direction generally bulging inwardly further localized regions of the tread progressively around the tire, simultaneously from both sides of the first named localized region.*

*16. The method of removing an air bag from a tire having bead rims and a tread comprising, axially separating the bead rims to allow passage of the air bag therebetween and to reduce the radial rigidity of the tread portion, bulging radially inwardly a localized region of the tread to thereby bow in a portion of the air bag, exerting continued pressure on the bowed-in portion of the air bag in a direction generally axially of the tire, and bulging inwardly further localized region progressively around the tire simultaneously from both sides of the first named localized region, and allowing each bulged region of the tread to resume its unstressed shape as its neighboring region is stressed in turn.*

*17. In a machine for removing an air bag from a tire having a tread, pressure means to bulge inwardly successive regions of the tread to eject successive portions of the air bag, and means adapted to engage the air bag after the first inward bulge and to axially withdraw it during the subsequent inward bulging.*

*18. In a machine for removing an air bag from a tire having a tread, means to bulge a single region of the tread radially inwardly to thereby produce a bowed-in portion of the air bag, pressure means to thereafter bulge inwardly successive regions of the tread to eject successive portions of the air bag, and means adapted to engage the first bowed-in portion and to axially withdraw the air bag while the said pressure means is effecting a subsequent inward bulging.*

EDWARD C. KASTNER.

REFERENCES CITED

The following references are of record in the file of this patent or the original patent:

UNITED STATES PATENTS

| Number | Name | Date |
|---|---|---|
| 1,683,736 | Snyder | Sept. 11, 1928 |
| 1,738,504 | Stevens | Dec. 3, 1929 |
| 1,853,146 | Prentice et al. | Apr. 12, 1932 |
| 2,241,807 | Cotner | May 13, 1941 |
| 2,244,162 | Leguillon | June 3, 1941 |